E. A. SCHREIBER.
HEATING APPARATUS FOR REFRIGERATOR CARS.
APPLICATION FILED APR. 2, 1917.

1,404,901.

Patented Jan. 31, 1922
8 SHEETS—SHEET 1.

E. A. SCHREIBER.
HEATING APPARATUS FOR REFRIGERATOR CARS.
APPLICATION FILED APR. 2, 1917.

1,404,901. Patented Jan. 31, 1922.
8 SHEETS—SHEET 3.

INVENTOR
Edward A. Schreiber
BY
Barnett & Sherman
ATTORNEYS

E. A. SCHREIBER.
HEATING APPARATUS FOR REFRIGERATOR CARS.
APPLICATION FILED APR. 2, 1917.

1,404,901.

Patented Jan. 31, 1922.
8 SHEETS—SHEET 4.

INVENTOR
Edward A. Schreiber
BY
Barnett & Numan
ATTORNEYS

UNITED STATES PATENT OFFICE.

EDWARD A. SCHREIBER, OF CHICAGO, ILLINOIS, ASSIGNOR TO EGBERT H. GOLD, OF CHICAGO, ILLINOIS.

HEATING APPARATUS FOR REFRIGERATOR CARS.

1,404,901.  Specification of Letters Patent.  Patented Jan. 31, 1922.

Application filed April 2, 1917. Serial No. 159,213.

*To all whom it may concern:*

Be it known that I, EDWARD A. SCHREIBER, a citizen of the United States, residing at Chicago, in the county of Cook and State of Illinois, have invented certain new and useful Improvements in Heating Apparatus for Refrigerator Cars, of which the following is a specification.

My invention relates to refrigerator cars, and the primary object is to provide a suitable heating apparatus for cars of this type. In the transportation of perishable freight such, for example, as fresh meat, it is important to keep the temperature of the cargo at a relatively fixed point throughout the entire run. A refrigerator car containing meat should be kept at about thirty-four degrees Fahrenheit. In the summer time, when the outside temperature is considerably above this point, all that is necessary in order that the cargo be kept at the desired temperature is that the car be properly iced and its walls insulated. In the winter time, however, the temperature of the cargo is likely to be reduced in very cold weather to a point below the freezing point and this is very objectionable. Meat is injured quite as much by being frozen as by not being kept at a sufficiently low temperature. Moreover, in the winter time the temperature is likely to vary quite considerably and with suddenness. The weather may change while the shipment is in transit, or the journey may be from a cold to a mild climate or vice versa. Under these conditions, if perishable goods, such as fresh meat, are to be carried without considerable loss, there must be some provision made for preventing the temperature of the car from falling to too low a point.

It is the object of the present invention to provide suitable means for accomplishing this result. With this end in view the invention provides a heating apparatus for a refrigerator car adapted to be employed, in conjunction with the icing arrangements of the car, for supplying, when required, as much heat as may be necessary to raise the temperature of the car to just the right point and to automatically maintain it at such point.

The invention consists in the novel and improved constructions, arrangements and devices, to be hereinafter described and claimed, for carrying out the above stated object and such other incidental objects as will appear from the following description.

The invention is illustrated, in a preferred embodiment, in the accompanying drawings wherein —

Like characters of reference designate like parts in the several figures of the drawings.

Figure 3:
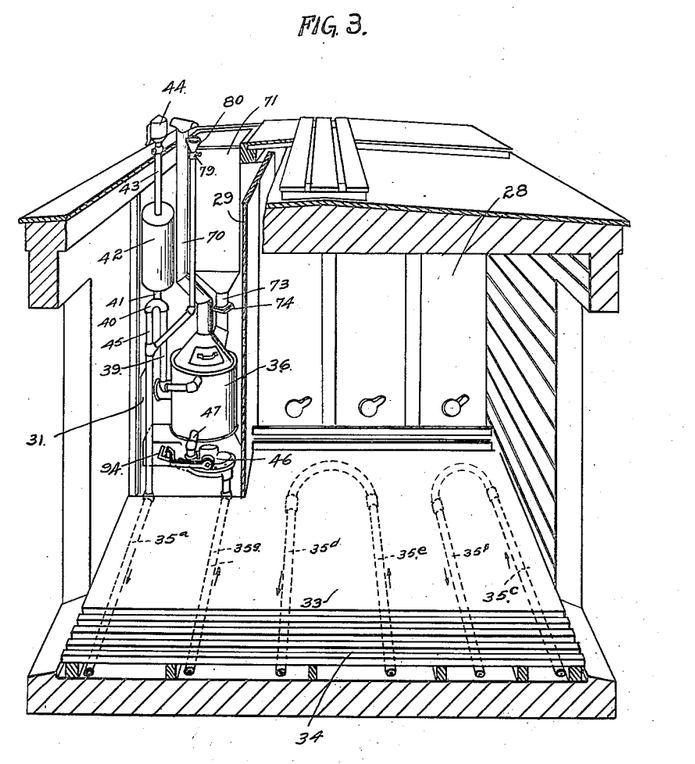
Fig. 3 is a fragmentary perspective of the end of the car in which the heater is located.

In the drawings, 25 designates the superstructure of a refrigerator car of standard type so far as its general construction is concerned. The car is provided with the usual icing compartment 26 at one end in which are arranged the ice tanks 27. The other end of the car has a similar icing compartment 28 (Fig. 3) except that it is made narrower so as to provide space for a heater compartment 29. The latter is accessible from the outside of the car through a door opening 30 closed by door 31.

Figure 1:
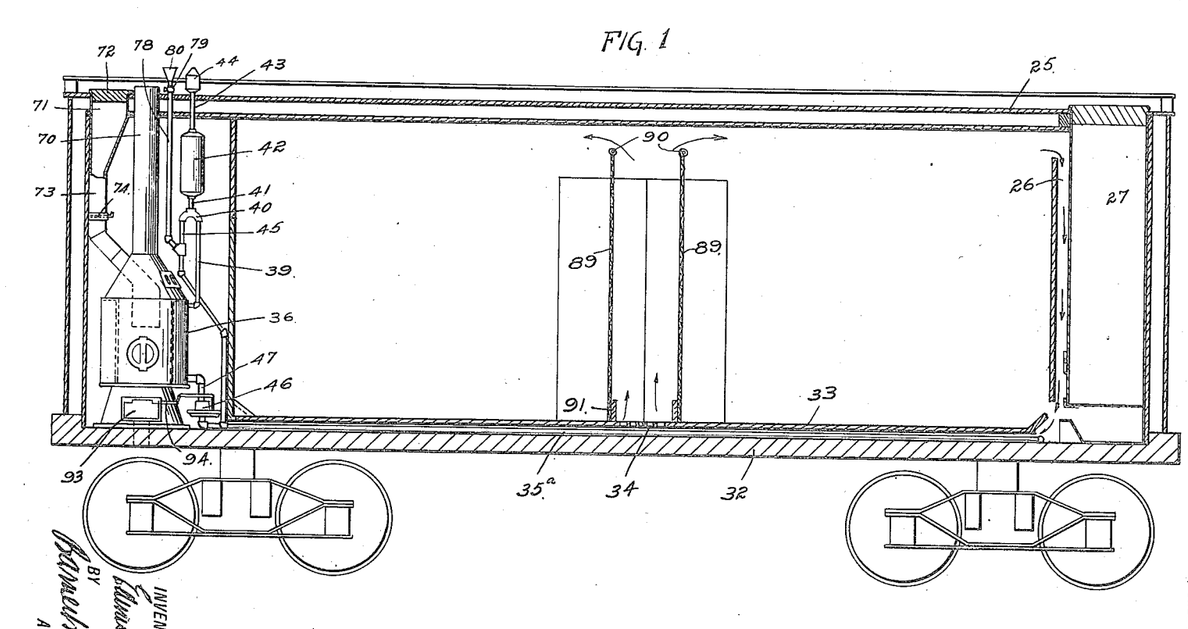
Fig. 1 is a longitudinal sectional view of a refrigerator car fitted with a heating system constructed in accordance with the invention.
Figure 2:
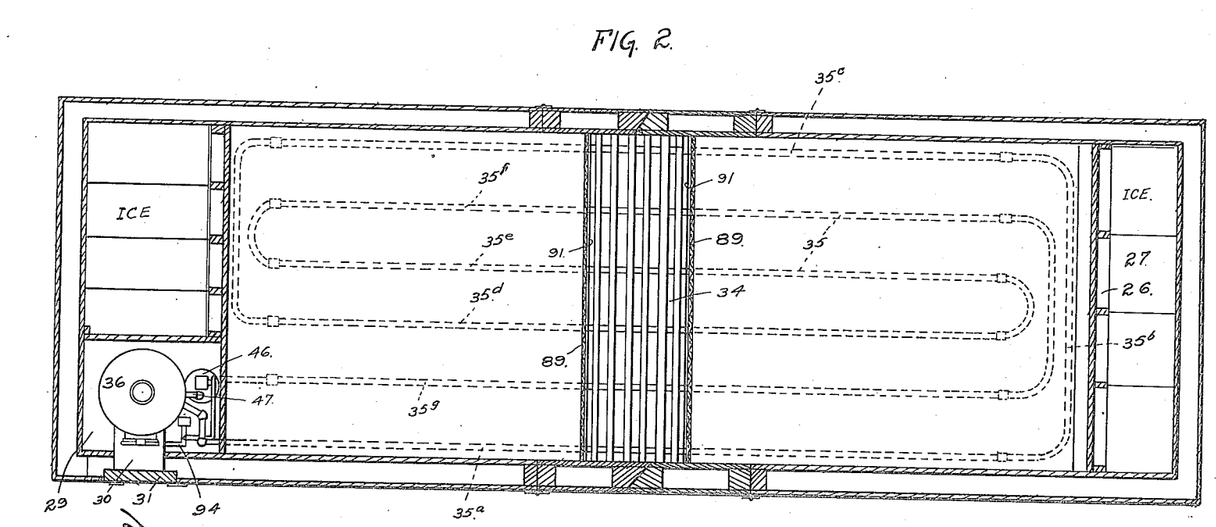
Fig. 2 is a plan view of the car.

Above the ordinary flooring 32 of the car is a false floor 33 having preferably a slatted section 34 in the middle of the car. Between the flooring 32 and false floor 33 is arranged a pipe system 35 for the circulation of heating medium, preferably water, or a salt solution. 36 designates a water heater arranged in compartment 29 and formed with a water jacket 37 surrounding its fire pot 38. The water heated in the jacket 37 passes through a pipe 39, fitting 40 and pipe 41, into the expansion tank 42, connected by pipe 43 with a condenser 44 which is located above the roof of the car. A pipe 45 leads from the fitting 40 to the circulating coil 35 which first extends along one side of the car, as indicated at 35$^a$, then along the end of the car, as indicated at 35$^b$, then along the opposite side of the car, as shown at 35$^c$, and thence back and forth, lengthwise of the car, through the center portion of the car, as indicated at 35$^d$, 35$^e$, 35$^f$ and 35$^g$, the medium being returned to the water jacket through a thermostatic controlling device 46 and pipe section 47, the thermostatic controlling device being adapted, as will be hereinafter described, to control the operation of the heater in accordance with the temperature conditions in the medium at the return end of the circulating system.

The heater is preferably constructed as follows: 48 is a base supporting a double shell which forms the firebox and water jacket. The inner wall 49 of the shell is comparatively thick for the purpose of making the heating of the water a slow and gradual process. The outer wall 50 is very much thinner and is preferably covered with an insulating covering 51. The base is formed with a forwardly projecting part 52 providing a draft passageway 53 leading to the space 54 under the grate 55. The double shell 49, 50 is provided with a tubular projection 56 providing an opening 57 into the fire-box above the fire level, this opening being closed by a door 58 which has a flange 59 provided with lugs 60 adapted to extend back of a flange 61 formed on the tubular projection 56; flange 61 being formed with notches 62 for lugs 60 when the door is put in place or removed, the door being rotated, when put in place, from a position in which the lugs 60 align with notches 62 sufficiently to produce a secure engagement thereof with the stove, and being opened by a reverse movement of rotation. In order to insure a tight fit the portions of the flange 61 engaged by the lugs 60 are thickened in the direction away from the notches 62 so as to bring about a wedging engagement between the door and the stove. The center part of the door is preferably made concavo-convex, as indicated at 63, and is formed with a handle 64 for convenience of manipulation. Supported on the connecting web 65 between walls 49, 50, is a plate 66 formed with perforations 67. The outer wall 50 projects above web 65 providing a flange 68 in which is seated the conical upper section 69 of the heater which supports smoke pipe 70, the latter extending through the roof of the car. 71 is a coal magazine the top of which projects through the roof of the car and is closed by cover 72. The coal magazine terminates in a chute 73 provided with a slide valve 74 which leads to the elbow-shaped tubular member 75, the upper end of which extends through casing member 69 and the lower end of which extends through and is supported on plate 66. Preferably the upper casing member 69 is formed with an opening covered by a slide damper 76 arranged between guides 77. The medium in the circulatory system is replenished through a water pipe 78 which taps pipe 45 and is provided above the level of the roof with a shut-off valve 79 and funnel 80.

Figure 4:
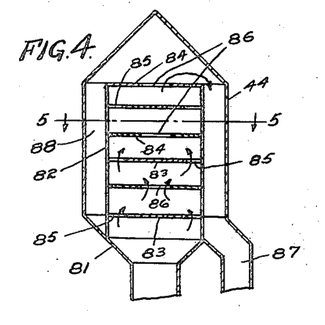
Figs. 4 and 5 are detail views illustrating a preferred construction of the condenser forming a part of the heating system of the car, Fig. 4 being a vertical sectional view and Fig. 5 a sectional plan on line 5—5 of Fig. 4.
Figure 5:
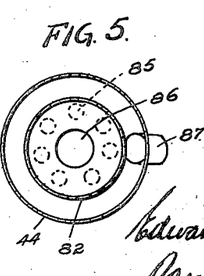
Figure 6:
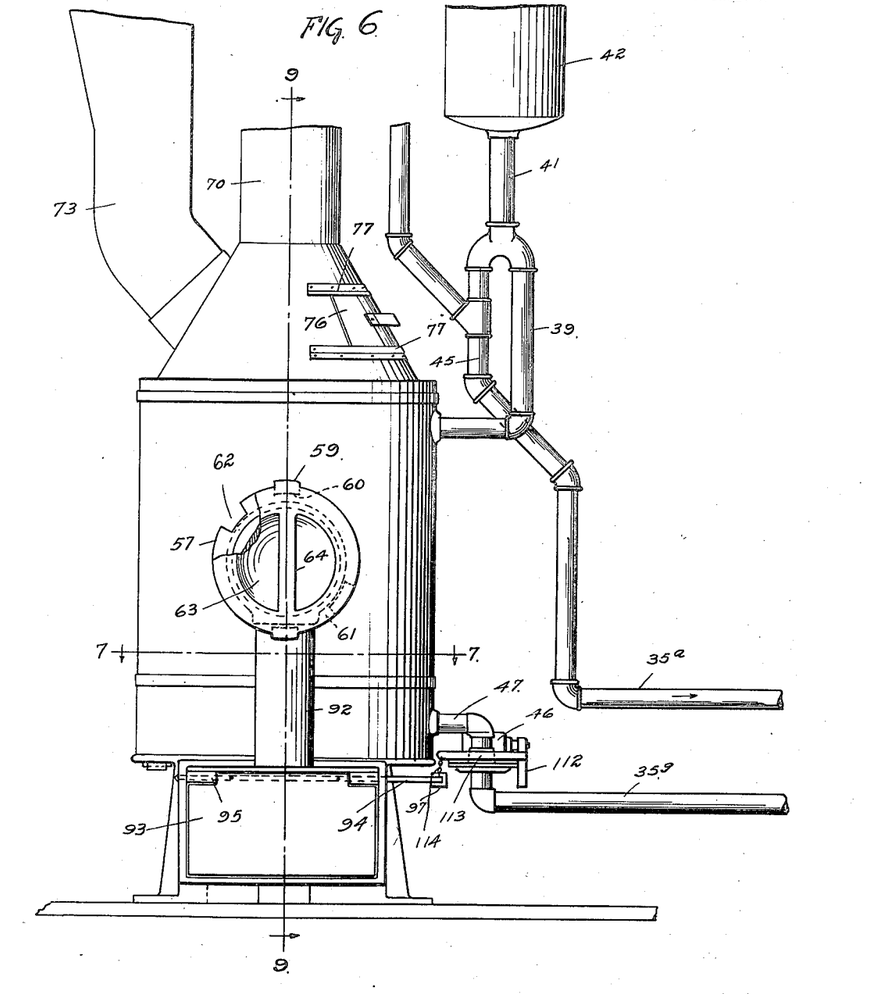
Fig. 6 is a front elevation of the heater or stove.
Figure 7:
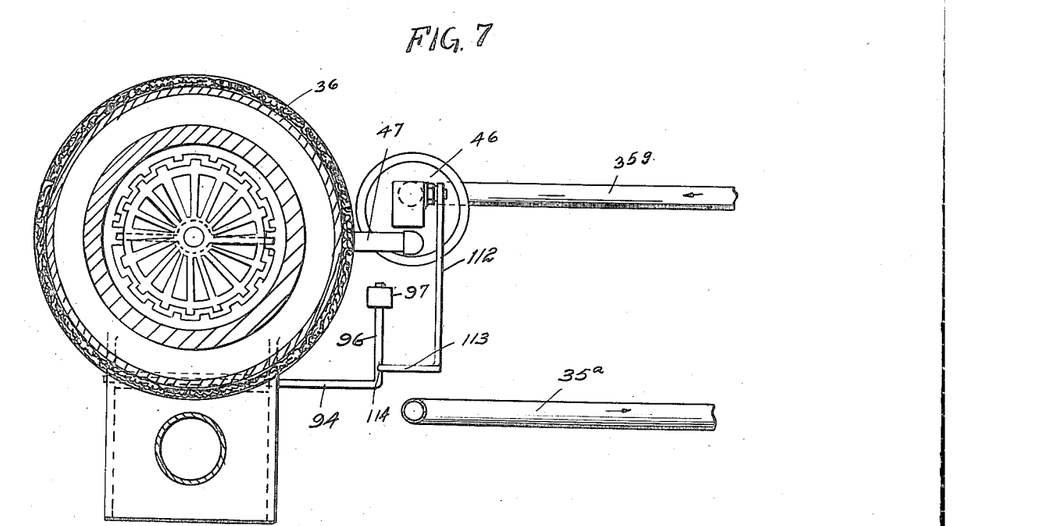
Fig. 7 is a sectional plan on line 7—7 of Fig. 6.
Figure 8:
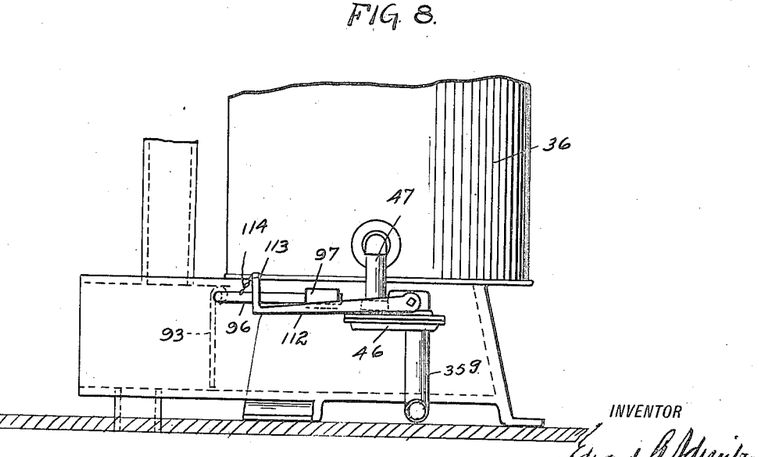
Fig. 8 is a side elevation of the lower portion of the heater.
Figure 9:
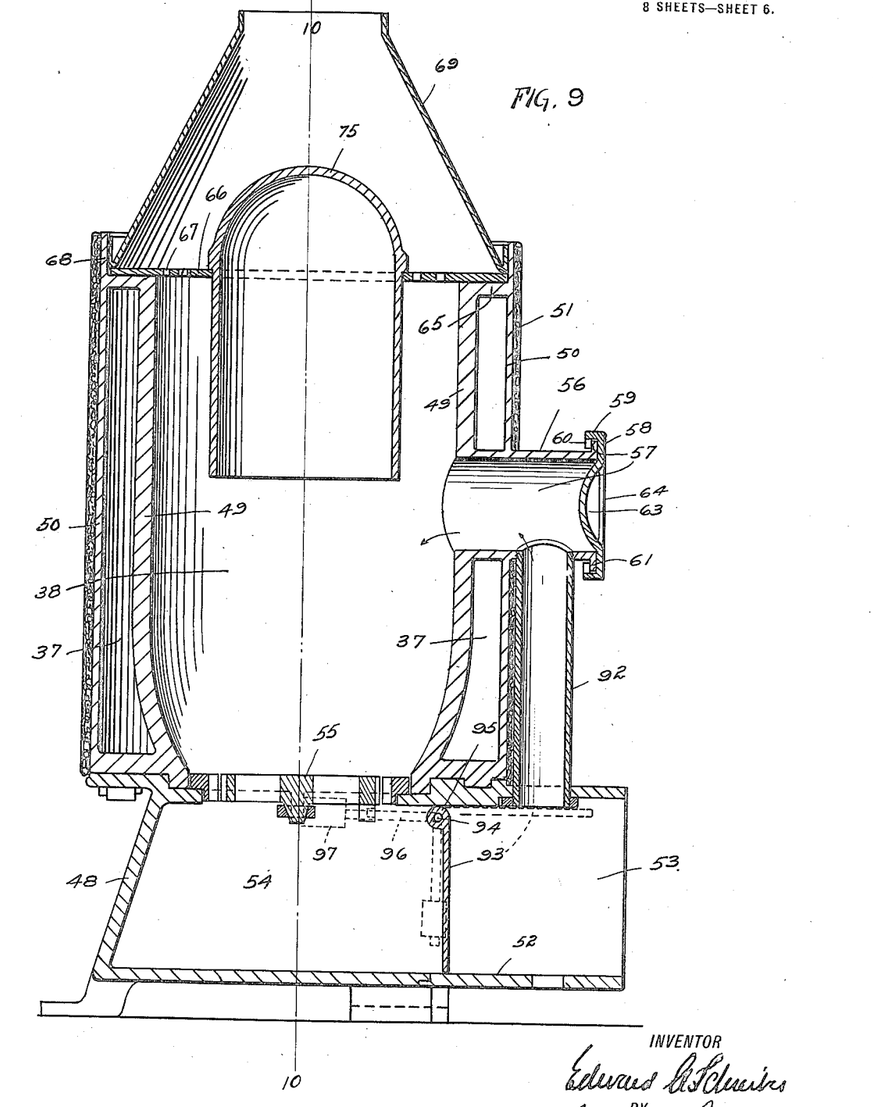
Fig. 9 is a vertical section on line 9—9 of Fig. 6.
Figure 10:
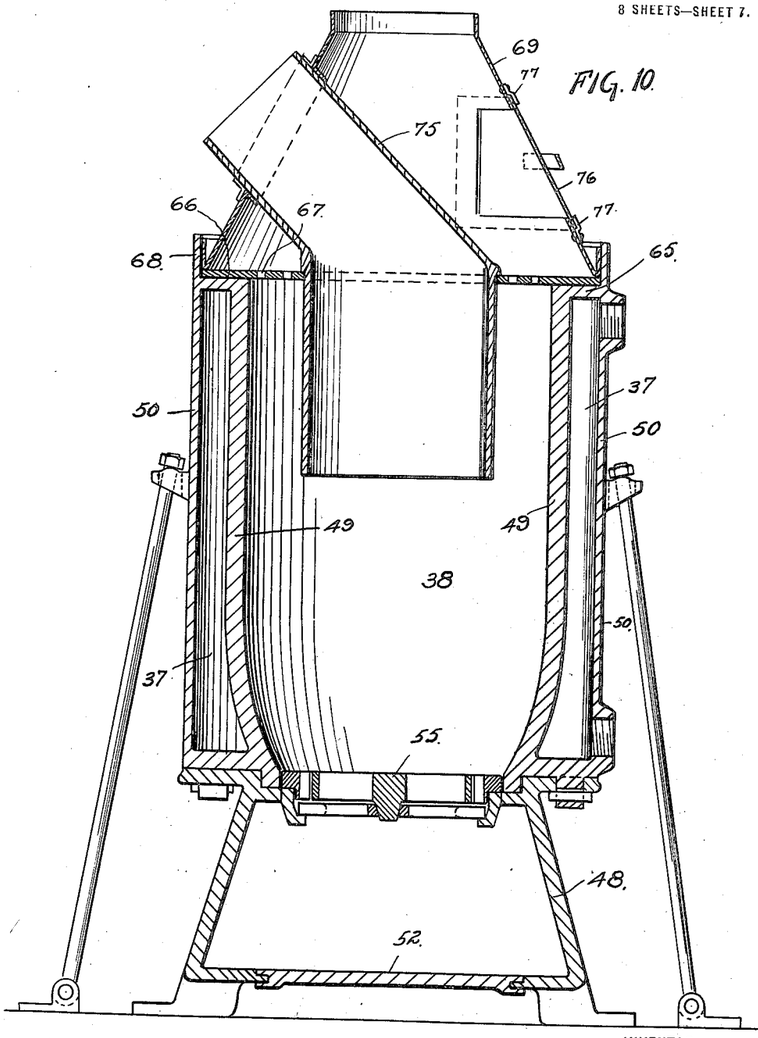
Fig. 10 is a vertical section on line 10—10 of Fig. 9.
Figure 11:
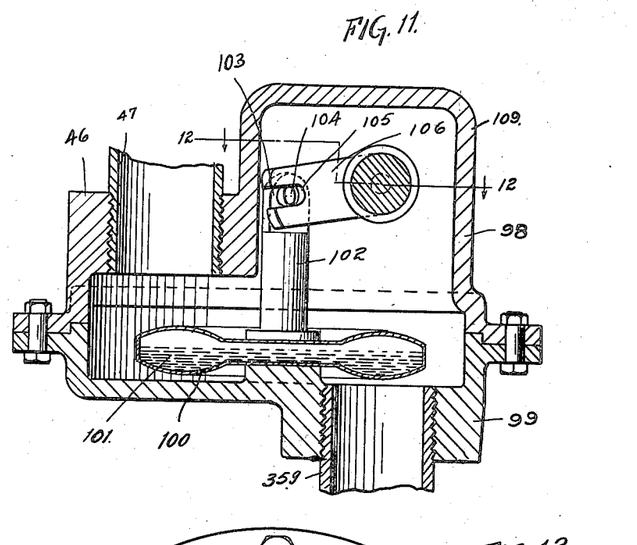
Figs. 11 and 12 are detail views illustrating the construction of the thermostatic controlling device for controlling the operation of the heater, Fig. 11 being a vertical section taken on line 11—11 of Fig. 12, and Fig. 12, a sectional plan on line 12—12 of Fig. 11.
Figure 12:
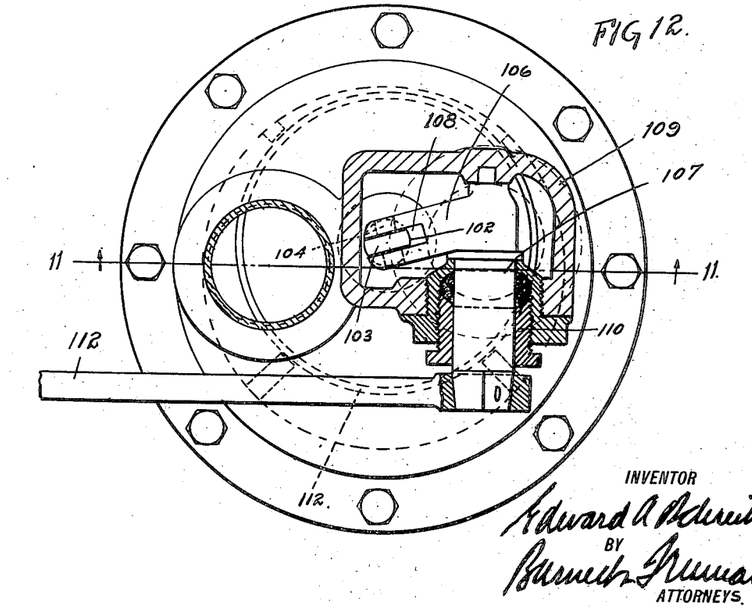

The condenser 44 is preferably constructed as shown in Figs. 4 and 5. Within the outer shell, the lower portion 81 of which is funnel-shaped and communicates with pipe 43, is an inner cylindrical shell 82 provided with a plurality of spaced partitions 83, 84, the former being provided with a series of peripheral openings 85 and the latter with central openings 86. 87 is an outlet pipe opening to the atmosphere from the space 88 between the outer casing of the condenser 44 and the inner casing 82. In the middle of the car, on opposite sides of the slatted section 34 of the false floor, is arranged a pair of spaced partitions 89, of duck, for example, which extend across the car from side to side, being supported at the top from transverse rods 90 and attached at the bottom to strips 91. The projection 52 from the base casting 48 of the heater is connected by pipe section 92 with the tubular projection 56 on the double shell of the heater. 93 is a damper fixed to a rock shaft 94 supported by bearings 95 on the base casting 48 which are placed so that the damper in one position will close the opening into the ash pit space 54 below the grate 55, and in another position will close the lower end of pipe 92. Rock shaft 94 is formed with an arm 96 on which is arranged a counterweight 97 adapted to hold the damper normally in its raised position across the end of pipe 92. The damper is shifted to the other position, in which it closes the opening into the ash pit, by means of the thermostatically operated device 46. This device is constructed as follows (Figs. 7, 8, 11 and 12):

Within a casing, composed of casing members 98, 99, is arranged an elastic hollow diaphragm 100 filled with a body of liquid 101 which expands when subjected to relatively high temperature. On the diaphragm is a stem 102, the upper end 103 of which is flat and furnished with a transverse stud 104, the ends of which lie within a slot 105 formed in an arm 106 on a member 107 revolubly mounted in casing member 98. The arm 106 is formed with a vertical slot 108 into which the flattened end 103 of stem 102 projects. The revoluble member projects through the side of the bonnet portion 109 of the casing member 98, a stuffing box 110 being provided to prevent leakage, and on the outer end of said member is fixed an arm 112 formed with a rectangularly extending portion 113 which is connected by means of the chain 114, or other suitable flexible connection, with the portion 96 of rock shaft 94.

Operation: The car is iced in the usual manner. If the trip is one in which severe weather is likely to be encountered the magazine 71 is filled with coal and a fire laid in the fire-box 38 of the heater. The circulatory system is filled with water through funnel 80. The water passes into the coil through pipes 78 and 45. It drives the air in the system before it, the air escaping through pipe 39, fitting 40, pipe 41, expansion tank 42, pipe 43 and the condenser 44, which latter is open directly to the atmosphere. By this arrangement the danger of formation of air pockets is obviated.

Assuming, as a typical instance, that the weather is mild at the start but that the run is to extend through a region of low temperature and finish in a warm climate, the fire in the heater will be lighted only when the temperature falls to a point requiring the heating of the car in order to maintain the temperature up to the desired point, say thirty-four degrees Fahrenheit. When the fire is lighted it will heat up the water quite gradually because of the thickness of the inner wall 49 of the water-jacketed fire-box. There is no occasion for a rapid heating of the water as the insulation of the car will serve to keep up the normal temperature for some little time even as against a sudden and considerable drop in outside temperature. The inner wall 49 is purposely made unusually thick so that the water in the circulatory system will be heated up slowly and will circulate slowly. The water at its maximum temperature, as it leaves the heater, first passes through the coldest part of the car, that is to say, through the region around the side and end walls thereof. It then passes back and forth through the center portion of the car and through the controller 46 back to the heater. If by the time it reaches the controller it has lost most of its heat its contact with the diaphragm 100 will leave the latter unaffected. If, however, because of a rise in outside temperature, for example, the water in the return end of the circulatory system is sufficiently hot, the diaphragm 100 will be expanded through the expansion of the liquid 101 which it contains, causing stem 102 to be raised, and member 112, 113 to be rocked which, by rocking the member 96, 94 against the force of counterweight 97, shifts the damper from its horizontal position across the end of pipe 92 to a vertical position in which it closes the opening leading to the ash pit. The draft being shut off underneath the grate and air being admitted to the heater above the fire, the fire is at once checked and the heating of the water in the circulatory system ceases or is retarded until such time as a drop in temperature causes a reverse movement of the damper.

It will be seen, therefore, that once having lighted a fire in the heater the control of the heating system is automatic, just enough heat being supplied to maintain the temperature of the car at the desired point regardless of fluctuations in outside temperature. The coal magazine is made large enough so that under ordinary circumstances it will hold enough fuel to keep the fire going throughout the entire trip. The heating system, therefore, once being started up, will require little or no attention. If necessary to get at the heater access may be had to it from the outside of the car so that the cargo does not have to be disturbed. The heating apparatus is constructed so that it will operate sluggishly and deliver the relatively small amount of heat required, which, however, is very evenly distributed by the peculiar arrangement of the heating coil and the provision of the partitions 89 and slatted section 34 whereby a considerable volume of the heat is delivered to the center of the car and circulated upwardly and toward the ends of the car.

The condenser minimizes loss by evaporation so that under ordinary circumstances the water in the circulating system will not have to be replenished during a trip. At the same time a vent is provided to the atmosphere preventing accident due to a high pressure resulting from possible failure of the controlling mechanism to operate properly.

The function of plate 66 is to slow down draft through the heater so that the circulation of the heating medium will be retarded. If necessary the damper 76 may also be open to the extent required.

I claim:

1. The combination with a refrigerator car having means for maintaining a circulation of refrigerated air in the car, of a heating apparatus adapted to be used in conjunction with said means to automatically maintain the circulated air at the desired refrigerated temperature during such times as the outside temperature is below the normal temperature of refrigeration.

2. The combination with a refrigerator car having means for maintaining a circulation of refrigerated air in the car, of a heating apparatus adapted to be used in conjunction with said means to automatically maintain the circulated air at the desired refrigerated temperature during such times as the outside temperature is below the normal temperature of refrigeration, comprising a circulatory system for a heating medium and a heater connected with said circulatory system for heating said medium, which is controlled in its operation by the temperature conditions of the medium in the circulatory system.

3. The combination with a refrigerator car having means for maintaining circulation of refrigerated air in the car, of a heating apparatus adapted to be used in conjunction with said means to automatically maintain the circulated air at the desired refrigerated temperature during such times as the outside temperature is below the normal temperature of refrigeration, comprising a circulatory system for a heating medium and a heater connected with said circulatory system, for heating said medium, which is controlled in its operation by the temperature conditions of the medium in the return end of said circulatory system.

4. The combination with a refrigerator car having means for maintaining circulation of refrigerated air in the car, of a heating apparatus adapted to be used in conjunction with said means to automatically maintain the circulated air at the desired refrigerated temperature during such times as the outside temperature is below the normal temperature of refrigeration, comprising a circulatory system adapted to circulate hot water as a heating medium and a heater connected with said circulatory system, for heating said water, which is controlled in its operation by the temperature conditions of the heating medium in the return end of said circulatory system.

5. The combination with a refrigerator car having means for maintaining circulation of refrigerated air in the car comprising ducts through which the refrigerated air normally circulates, of a heating apparatus adapted to be used in conjunction with said means comprising a circulatory system arranged in said ducts adapted to circulate hot water as a heating medium, and a heater connected with said circulatory system for heating said medium, which is controlled in its operation by the temperature conditions of the medium in the return end of said circulatory system.

6. The combination with a refrigerator car having means for maintaining circulation of refrigerated air in the car, comprising ducts through which the refrigerated air normally circulates, of a heating apparatus adapted to be used in conjunction with said means to automatically maintain the circulated air at the desired refrigerated temperature, comprising a circulatory system in the car adapted to circulate water as a heating medium, a water-jacketed stove to heat the water in said circulatory system and a thermostatic mechanism associated with said stove and circulatory system which is influenced by the temperature in the circulatory system for controlling the operation of said stove.

7. The combination with a refrigerator car having means for maintaining circulation of refrigerated air in the car comprising ducts through which the refrigerated air normally circulates, of an automatically controlled heating apparatus adapted to be used in conjunction with said ducts for maintaining the circulated air at the desired refrigerated temperature comprising a circulatory system arranged in said ducts and adapted to circulate water as a heating medium, a water-jacketed stove associated with said circulatory system to heat the water therein, and a thermostatic mechanism associated with said stove and circulatory system which is influenced by the temperature in the return end of the circulatory system for controlling the operation of said stove.

8. The combination with a refrigerator car having means for maintaining circulation of refrigerated air, of an automatically controlled heating apparatus adapted to cooperate with said means for maintaining the circulated air at the desired temperature, comprising a hot water circulatory system, a stove connected with said circulatory system to heat said water and provided with a controlling damper and a thermostatic mechanism controlled by the temperature of the water in said circulatory system for opening and closing said damper.

9. The combination with a refrigerator car having means for maintaining circulation of refrigerated air, of an automatically controlled heating apparatus adapted to cooperate with said means to maintain the circulated air at the desired temperature, comprising a hot water circulatory system, a stove connected with said circulatory system to heat said water and provided with a controlling damper and a thermostatically operated mechanism controlled by the temperature of the water in the return end of the said circulatory system for opening and closing said damper.

10. The combination with a refrigerator car having means for maintaining circulation of refrigerated air, of an automatically controlled heating apparatus adapted to cooperate with said means to maintain the circulated air at the desired temperature, comprising a circulatory system in the car adapted to circulate hot water as a heating medium, a stove connected with said circulatory system for heating the water therein and provided with draft passages adapted to direct air into the fire box of the stove at points respectively above and below the fire therein, a damper adapted, in one position, to close one of said passages, and in another position to close the other of said passages, and a thermostatically operated mechanism associated with said circulatory system for shifting said damper from one position to the other.

11. The combination with a refrigerator car having means for maintaining circulation of refrigerated air, of an automatically controlled heating apparatus adapted to cooperate with said means to maintain the circulated air at the desired temperature, comprising a circulatory system in the car adapted to circulate hot water as a heating medium, a stove connected with said circulatory system for heating said water, and provided with draft passages adapted to direct air into the fire box of the stove at points respectively above and below the fire therein, a damper, adapted in one position, to open the draft passage leading to the fire box below the fire and to close the draft passage leading to a point above the fire, and in another position to open the draft passage leading to a point above the fire and close the draft passage leading to a point below the fire.

12. The combination with a refrigerator car having means for maintaining circulation of refrigerated air, of an automatically controlled heating apparatus adapted to cooperate with said means to maintain the circulated air at a desired temperature, comprising a hot water circulatory system in the car, a stove connected with said circulatory system for heating said water, and provided with draft passages adapted to direct air into the fire box of the stove at points respectively above and below the fire box therein, a damper adapted, in one position, to close one of said passages, and in another position, to close the other of said passages, and a thermostatically operated mechanism associated with said circulatory system and damper for shifting said damper from one position to the other which is responsive to the temperature condition of the heating medium in the return end of said circulatory system.

13. The combination with a refrigerator car having means for maintaining circulation of refrigerated air, of an automatically controlled heating system adapted to cooperate with said means to maintain the circulated air at the desired temperature, comprising a circulatory system in the car for a heating medium, a heater for heating said medium provided with draft passages leading to points respectively above and below the fire in said heater, and thermostatically-operated means for alternately opening and closing one of said passages and at the same time closing or opening the other of said passages.

14. The combination with a refrigerator car, of an automatically controlled heating apparatus adapted to be used in conjunction with the icing arrangement of the car, comprising a circulatory system in the car adapted to circulate hot water as a heating medium, and a heater for said water comprising a water-jacketed fire box structure having inner and outer metal shells providing a water jacket, the inner shell being relatively thick in comparison with the outer shell so as to retard the heating of the water in said jacket.

15. The combination with a refrigerator car having means for maintaining circulation of refrigerated air, of an automatically controlled heating apparatus adapted to cooperate with said means to maintain the circulated air at the desired temperature, comprising a circulatory system in the car adapted to circulate hot water as a heating medium, a heater connected with said circulatory system to heat said medium and provided with a controlling damper adapted, in one position, to admit air to the heater at a point below the fire therein, and in another position, to admit air to the heater at a point above said fire, a thermostat casing in communication with the circulatory system, an expansible member arranged in said casing, and mechanism operated by the expansion of said expansible member for moving said damper from one of said positions to the other.

16. The combination with a refrigerator car, of an automatically controlled heating system adapted to be used in conjunction with the icing arrangements of the car comprising a heater, and a water circulatory system connected thereto provided with two substantially vertical pipes connected at their upper ends and having a vent to the atmosphere above the point of said connection, and a filling pipe leading to one of said first-named pipes below the point of connection with the other pipe.

17. The combination with a refrigerator car, of an automatically controlled heating system adapted to be used in conjunction with the icing arrangements of the car comprising a heater, a water circulatory system connected thereto provided with two substantially vertical pipes connected at their upper ends, an expansion tank above the aforesaid two pipes and connected therewith having means providing a vent to the atmosphere, and a filling pipe leading to one of said first-named pipes below the place of connection with the other pipe.

18. The combination with a refrigerator car, of an automatically controlled heating system adapted to be used in conjunction with the icing arrangements of the car comprising a heater, a water circulatory system connected thereto provided with two substantially vertical pipes connected at their upper ends, an expansion tank above the aforesaid two pipes and connected therewith, a condenser having a vent to the atmosphere arranged on the roof of the car and connected with said expansion tank, and a filling pipe leading to one of said first-named pipes below the place of connection with the other pipe.

19. The combination with a refrigerator car having means for maintaining circulation of refrigerated air, of an automatically controlled heating apparatus co-operating with said means to maintain the circulated air at the desired temperature comprising a circulatory system for a heating medium consisting of a pipe coil which extends back and forth lengthwise of the car adjacent the floor thereof.

20. The combination with a refrigerator car, of an automatically controlled heating apparatus therefor comprising a circulatory system for a heating medium consisting of a pipe coil which lies adjacent the floor of the car and is arranged so that the medium circulating therethrough passes, when first heated, along one side of the car, then across the end, then along the other side of the car and then lengthwise of the car through the middle portion thereof.

21. The combination with a refrigerator car, of an automatically controlled heating apparatus therefor comprising a circulatory system for a heating medium consisting of a pipe coil which lies adjacent the floor of the car and is arranged so that the medium circulating therethrough passes, when first heated, along one side of the car, then across the end, then along the other side of the car and then lengthwise of the car through the middle portion thereof, and a heater for heating the medium in said system which is controlled by the temperature in the return end of said coil.

22. The combination with a refrigerator car, of an automatically controlled heating apparatus therefor comprising a circulatory system for a heating medium consisting of a pipe coil which lies adjacent the floor of the car and is arranged so that the medium circulating therethrough passes, when first heated, along one side of the car, then across the end, then along the other side of the car and then lengthwise of the car through the middle portion thereof, and a heater for heating the medium in said circulatory system comprising a fire-box having draft passages leading one above and one below the fire, and thermostatically operated means for opening and closing one of said passages and at the same time closing or opening the other.

23. The combination with a refrigerator car, of an automatically controlled heating apparatus therefor comprising a circulatory system for a heating medium consisting of a pipe coil which lies adjacent the floor of the car and is arranged so that the medium circulating therethrough passes, when first heated, along one side of the car, then across the end, then along the other side of the car, and then lengthwise of the car through the middle portion thereof, a heater for heating the medium in said circulatory system comprising a fire-box having draft passages leading one above and one below the fire, a damper which in one position closes one of said passages and in another position the other passage, and a thermostatically-operated device influenced by the temperature in the return end of said circulating coil for operating said damper.

EDWARD A. SCHREIBER.